United States Patent
Åbyhammar

[19]

[11] Patent Number: 6,138,381
[45] Date of Patent: Oct. 31, 2000

[54] TREATMENT OF MOIST FUEL

[75] Inventor: Tomas Åbyhammar, Vällingby, Sweden

[73] Assignee: Vattenfall AB (Publ.), Stockholm, Sweden

[21] Appl. No.: 09/051,660

[22] PCT Filed: Oct. 21, 1996

[86] PCT No.: PCT/SE96/01343

§ 371 Date: Apr. 16, 1998

§ 102(e) Date: Apr. 16, 1998

[87] PCT Pub. No.: WO97/14926

PCT Pub. Date: Apr. 24, 1997

[30] Foreign Application Priority Data

Oct. 19, 1995 [SE] Sweden .................................. 9503670

[51] Int. Cl.[7] .................................................. F26B 3/00
[52] U.S. Cl. .................... 34/468; 34/478; 34/73
[58] Field of Search ................................ 34/329, 330, 337, 34/343, 467, 468–471, 478–479, 73–79

[56] References Cited

U.S. PATENT DOCUMENTS 5,215,670  6/1993  Girovich ................................ 210/770
5,237,757  8/1993  Wiedmann et al. .
5,263,266  11/1993  Schmidt ................................ 34/32

Primary Examiner—Pamela Wilson
Assistant Examiner—Andrea M. Joyce
Attorney, Agent, or Firm—Burns, Doane, Swecker & Mathis, L.L.P.

[57] ABSTRACT

A process of treating moist fuel, particularly biomass fuel, in connection with a power production process, comprises drying moist fuel (7) by means of combustion air (3), which is thereafter supplied to the power production process combustion section (1). Flue gas (11) from the combustion section, which as a result of said drying has become moisture-laden, is condensed (13) while recovering heat (15), which may be used as drying heat. In accordance with a preferred embodiment, the flue gas condensation is used to humidify (31) the combustion air.

31 Claims, 5 Drawing Sheets

TREATMENT OF MOIST FUEL

TECHNICAL FIELD

The present invention relates to treatment of moist fuel in connection with a power production process, for instance in a steam power plant. The treatment comprises drying of the fuel, which typically may be a biomass fuel.

TECHNOLOGICAL BACKGROUND

It is well known that drying of humid fuel, such as biomass fuel, produces essential advantages in connection with the subsequent combustion of the fuel. Separate drier systems for e.g. biomass fuel have been constructed. Drying heat is then produced, for instance in a separate furnace, wherein part of the moist fuel, is consumed. Flue gases from the oven are used to dry the fuel, for instance in a rotary drier. The moist flue gases from the drier may be condensed for recovery of heat that may be used to pre-dry the fuel to a certain extent before the latter is fed to the drier.

It is likewise known to utilise flue gas condensation in connection with conventional combustion of moist fuel, for instance in a hot water boiler. In this case, the high moisture contents obtained in the flue gases due to the moisture in the fuel are utilised.

PURPOSE OF THE INVENTION

A primary object of the present invention is to provide a process for treatment of moist fuel which in an efficient manner combines fuel drying with flue gas condensation.

A further object of the invention is to provide a process for treatment of moist fuel which in a simple manner may be integrated into conventional power production processes.

Yet another object of the invention is to provide a process for treatment of moist fuel which offers considerable environmental advantages.

A further object of the invention is to provide a process for treatment of moist fuel which is easily adaptable to different power production processes and operational conditions.

SUMMARY OF THE INVENTION

The above objects are achieved by means of a process and a plant possessing the characteristic features defined in the appended claims.

Thus, the invention is based on the knowledge of the advantage of combining drying of moist fuel by means of the conventional combustion air supplied to the combustion section in a power production process with condensing of flue gases from the power production process, said flue gases having become moisture-laden in said drying process. The thus dried fuel preferably is used as the fuel for combustion in the associated combustion section of the power production processing section. The fuel may be used directly after drying or after suitable intermediate storage.

By power production process should in this connection be understood a process essentially producing power and/or heat. Typically, it could be a condensing power plant or a combined power and heating plant based on a steam turbine cycle, a directly or indirectly heated steam turbine cycle, or a combined gas turbine and steam cycle.

By combustion air should be understood air that normally is supplied to the combustion section of the power production process, as a rule air at a low temperature supplied directly from the environment.

The invention involves utilisation in one and the same system of the gas flow passing through the system, without the latter being negatively affected. In an advantageous manner the basis is the combustion section or boiler proper, based on which such modifications of the system as are necessary to the invention can be made easily. It should be noted that the principal process as such may be practically unaffected and that the drier section of the system may handle its own flow of fuel to be dried and that said flow may be entirely independent of the fuel flow which at a certain instant is adequate for the combustion section of the system.

By using combustion air as a medium for drying the fuel it becomes possible to keep the drying temperature low and in addition emissions from the dried fuel will be treated efficiently in the combustion section, since all essential drying medium passes therethrough. In addition, according to the invention intake and discharge of fuel into and out of the drier may be effected at a pressure near the atmospheric pressure.

The at least initially comparatively low drying temperature, i.e. the temperature of the drying air supplied, is achieved because it is possible to collect the drying air directly from the exterior. Typical temperature levels of drying air passing into the first drier that is being used are approximately 0° C.—approximately 30° C., especially approximately 15° C.—approximately 20° C. The latter temperature levels may be achieved if as drying air is used air that has passed through a boiler house or the like incorporated in the power generating process, in which the air has been heated by the waste heat from the power generating process.

An essential characteristic of the invention is the use, as drying heat, at least essentially, of secondary heat from the power production process, i.e. no primary heat source is used for the drying heat. Consequently, as drying heat is used essentially heat withdrawn only after the generated heat has been exploited in the power production process in the conventional manner.

In other words, no fuel need to be utilised directly for operating the drying process. Nor is it necessary to use any other source of heat exclusively for the drying operation.

In accordance with the invention it is preferable to use heat recovered from the condensation of flue gases to dry fuel in combustion air, although heat thus recovered obviously could be used also for instance for district-heating purposes. This exploitation for heating purposes may conveniently be effected by using the recovered heat to heat the combustion air before said air passes the fuel for drying thereof.

When the power production process includes a vapour cycle the condensating heat from the vapour cycle may be used in an advantageous manner for fuel drying, preferably for heating fuel-drying combustion air. As is easily understood it could be a matter of operating the fuel drying by means of low-pressure vapour, which gives low losses of electric power of the used steam turbine. Steam bleeding may be effected from several different steam stages.

It is possible to utilise flue gas condensation heat and steam condensation heat separately or in combination, to effect fuel drying.

For fuel-drying purposes it is also possible to make use of flue gases from the power production process prior to condensing the flue gas. The flue gas heat may be used indirectly by heating combustion air intended for fuel drying or directly for fuel drying in flue gases. In the latter case it is often suitable to use a partial flow of flue gases which flow, having been in contact with the fuel to be dried, is returned to the combustion section together with the combustion air.

Preferably, drying of fuel while using flue gases is effected as a last step before utilisation of the dried fuel, since volatile components contained in the fuel have been expelled in previous steps. Direct "final drying" of the fuel by means of flue gases also is a protection against explosion and burning of the dried fuel.

Direct flue gas drying in exiting flue gases (exhausts) could be advantageous from environmental points of view because the contact flue gas/fuel causes certain substances, such as hydrocarbons, nitric oxides, ammonium, large molecules and tracer metals to be adsorbed on the fuel and thus to be returned to the combustion section, wherein these substances may be destructed or leave the process via the flow of ashes. Drying in flue gases likewise produces the desired additional humidification of the flue gas prior to condensation.

In accordance with the invention, the flue gas condensation may also be used to further humidify the combustion air, preferably after the latter air having been used for fuel drying. This humidification of the combustion air preferably is controlled in response to the flue gas condensation temperature, ensuring optimum operational conditions. Thus, it becomes possible to detect the condensation temperature and to control the humidification of the combustion air to ensure that the condensation temperature is maintained at a desired level.

Flue gas condensation in accordance with the invention may also be used for additional cleaning of the flue gases. High-efficiency supplementary separation of for instance sulphur and ammonium may provide improved bases of optimisation and degrees of freedom as concerns the measures to be taken in the combustion section bed, the choice of fuel, bed materials and DeNOx-method, etc.

The process in accordance with the invention results in very advantageous performance allowing the utilisation in the process of supplementary equipment that is comparatively uncomplicated and which may be constructed in accordance with well-known and well-functioning technology. An essential advantage is that the principal process may continue also in case of disturbances in said supplementary equipment, possibly with a somewhat reduced efficiency. The specific investment costs are not essentially different from those in a conventional plant of basic design. An increase of the efficiency—in the case of the production of electric energy because the thermal efficiency of the fuel is increased—increased heat production because drying is combined with condensation, and improved emission values are important features of the invention.

The invention will be described in more detail in the following by way of exemplary embodiments with reference to the accompanying drawings.

DETAILED DESCRIPTION OF EMBODIMENTS

Figure 1:
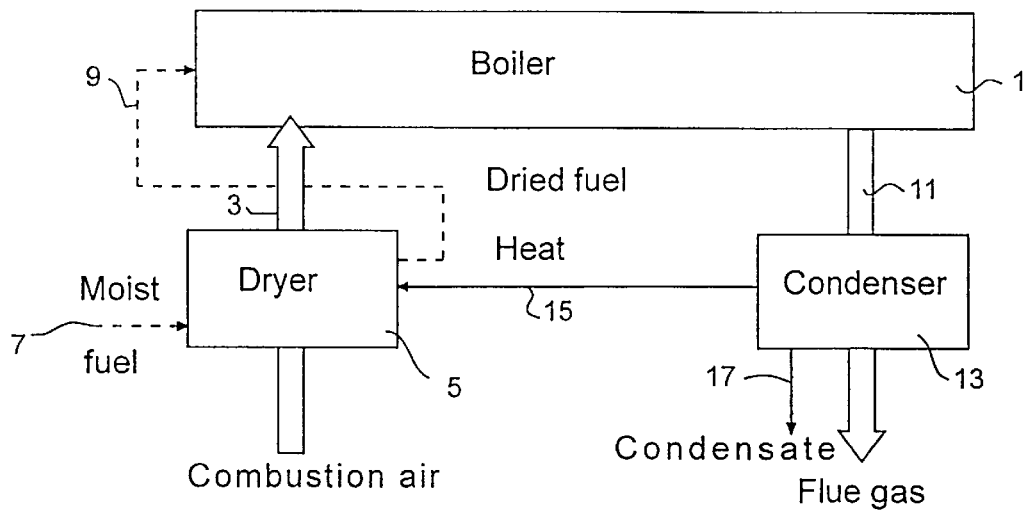
FIG. 1 illustrates schematically a first embodiment of the present invention.

In accordance with the embodiment of the present invention illustrated in FIG. 1, a power production process, in this case generally represented by a "boiler" which may be a CFB or powder boiler in a steam generating power plant using among other substances biomass fuels, or another incinerating device and which naturally could include customary accessory equipment, is supplied with combustion air 3 via an indirectly heated fuel drier 5. The combustion air is unheated air drawn directly from the environment. The fuel drier 5 is supplied with moist fuel 7 which, after having passed through the drier 5, is entered into the boiler 1 in the form of dried fuel 9. The drier 5 could be of any suitable prior-art construction, such as a belt drier.

Since the drying is carried out at low temperature levels, it is preferable to use drier constructions that are capable of handling large volumes of air, are formed with large cross-sectional areas for contact between the drying air and the fuel to be dried, and have large thermal surfaces in the heat exchangers in use, etc. as is readily understood by the person skilled in the art.

Flue gases 11 leaving the boiler 1 passes through a condenser/dehumidifier 13 and are then discharged into the atmosphere, possibly after having been duly cleaned. Heat 15 recovered in the condenser 13, which preferably is of any convenient prior-art construction, is passed to the drier 5 in any suitable manner to heat the supplied combustion air, making the latter capable of drying the supplied moist fuel. From the condenser 13 the condensate 17 is discharged and taken care of in some suitable manner.

Figure 2:
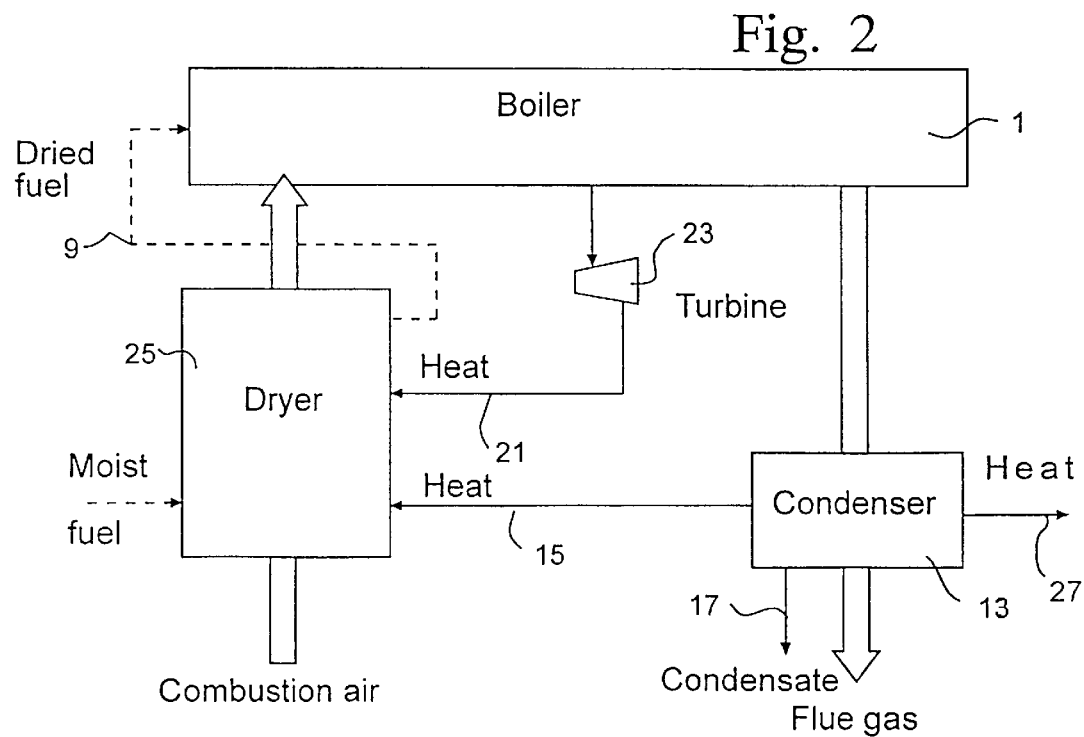
FIG. 2 illustrates schematically a second embodiment of the present invention.

The embodiment illustrated in FIG. 2 is modified relatively to the one illustrated in FIG. 1 in that the drier 25 operates in two steps. The first step is supplied with heat from the condenser 13 like in FIG. 1, whereas the second step is supplied with heat from low-pressure steam 21 withdrawn from a steam turbine 23 driven by the boiler 1. This second step could in itself comprise a plurality of partial steps, each being supplied by steam tapped from different turbine steps and having different temperatures.

In accordance with this embodiment, heat 27 recovered in the condenser 13 is supplied for instance to a district heating network.

As the person skilled in the art immediately realises it becomes possible in an advantageous manner to "play" with various heat tappings whereby it becomes possible to efficiently adapt the process to the operational conditions of the principal process of the boiler. As the person skilled in the art likewise readily understands one possible modification of the embodiment of FIG. 2 is to eliminate the heat supply 15 to the drier 25. Another possible modification is to operate the heat flows 15 and 21 to the drier 25 in parallel.

Figure 3:
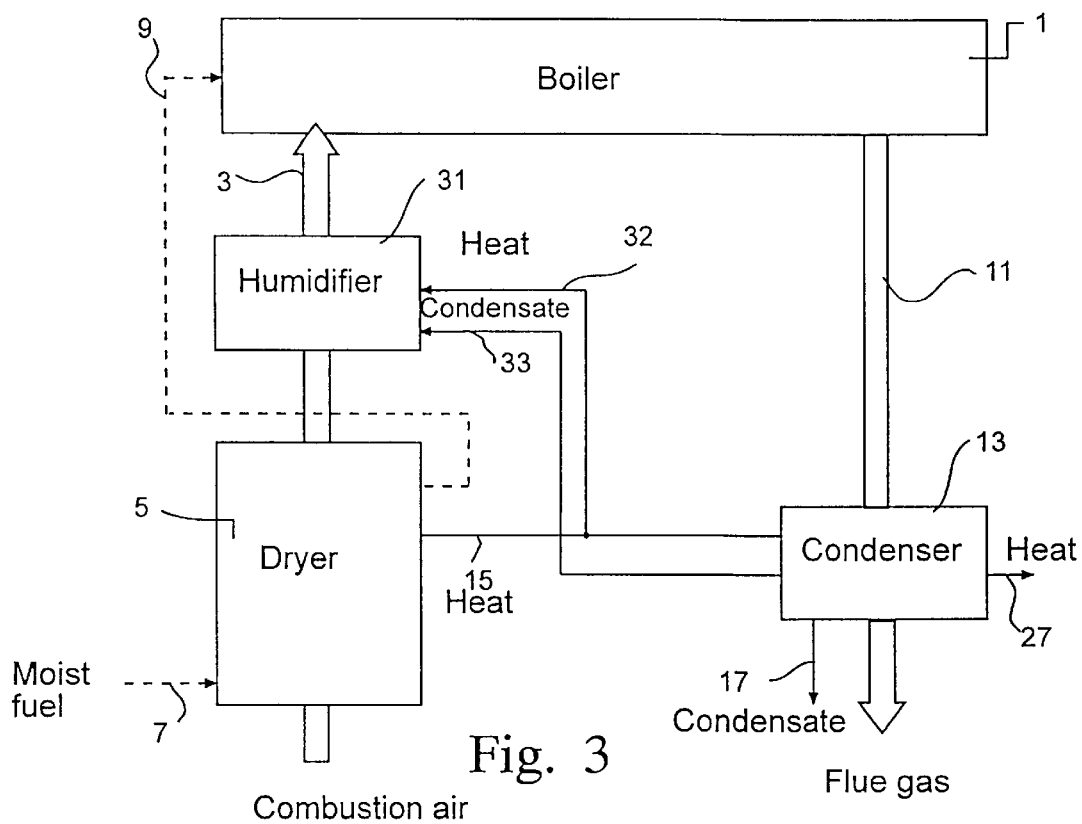
FIG. 3 illustrates schematically a third embodiment of the present invention.

The embodiment of FIG. 3 is based on that according to FIG. 1 but has been supplemented with an air humidifier 31 through which the combustion air from the drier 5 passes before entering the boiler 1. To humidify the air 3, the humidifier 31 is supplied with heat 32 and condensate 33 from the condenser 13. Also in this case, the condenser may give off heat 27, for example to a district heating network.

The humidifier 31 may be designed in any convenient optional manner.

Figure 4:
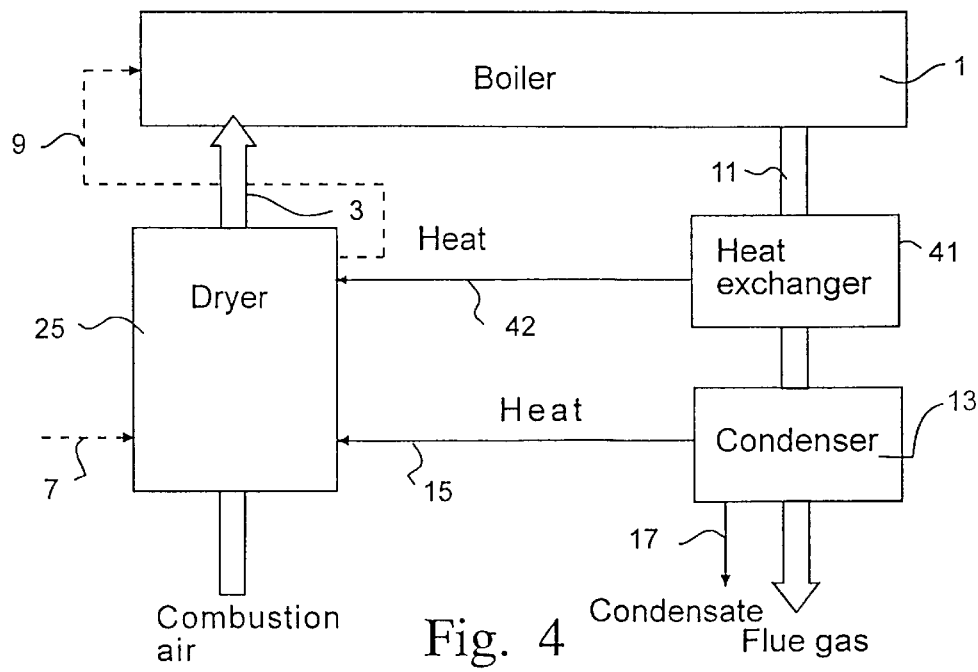
FIG. 4 illustrates schematically a fourth embodiment of the present invention.

The embodiment according to FIG. 4 is based on that according to FIG. 2 but the second drying step is supplied with heat at 42, not from a steam turbine but from a heat exchanger 41 positioned in the flue gas flow 11 leaving the power production process. In this case it is a question of indirect heat transfer to the drier 25 and to the fuel dried therein.

Figure 5:
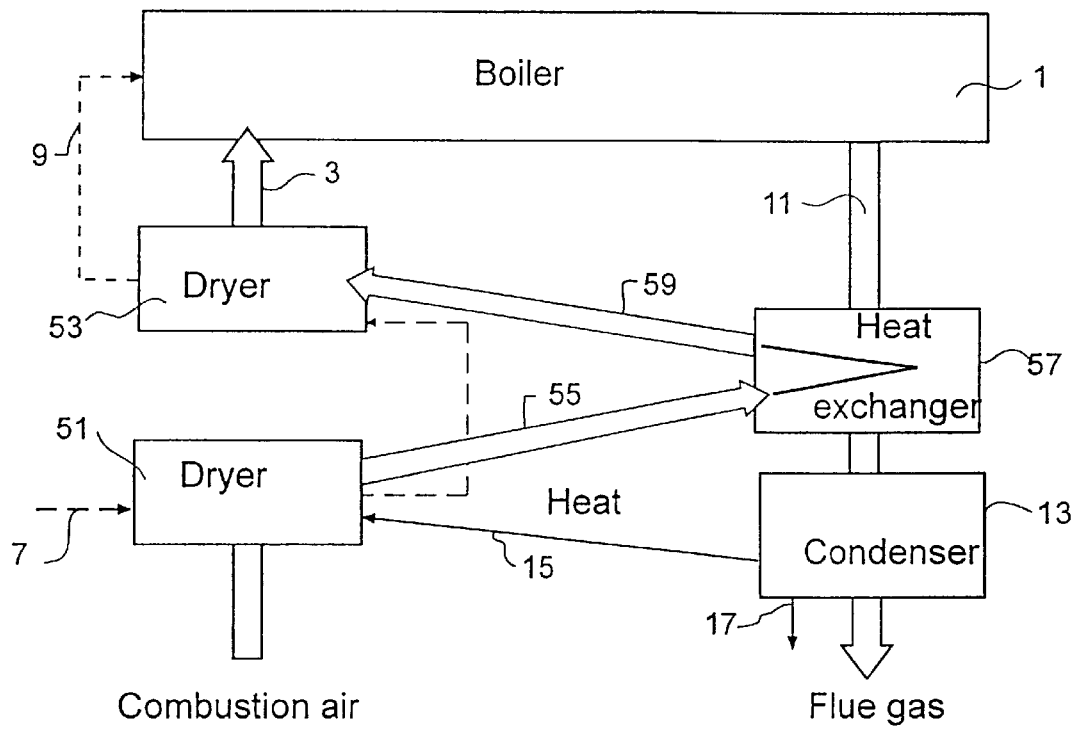
FIG. 5 illustrates schematically a fifth embodiment of the present invention.

In accordance with the embodiment of FIG. 5, the fuel 7 is dried in two driers 51 and 53 coupled in series, the first one of which corresponds to the drier 5 of FIG. 1. The air 55 leaving the drier 51 is conducted to a heat exchanger 57 for heat exchange with the flue gas 11. The air 59 the temperature of which thus is raised, is supplied to the second drier 53 which preferably is of the same kind as the drier 51, in order to be subsequently passed into the boiler 1 as combustion air 3.

Figure 6:
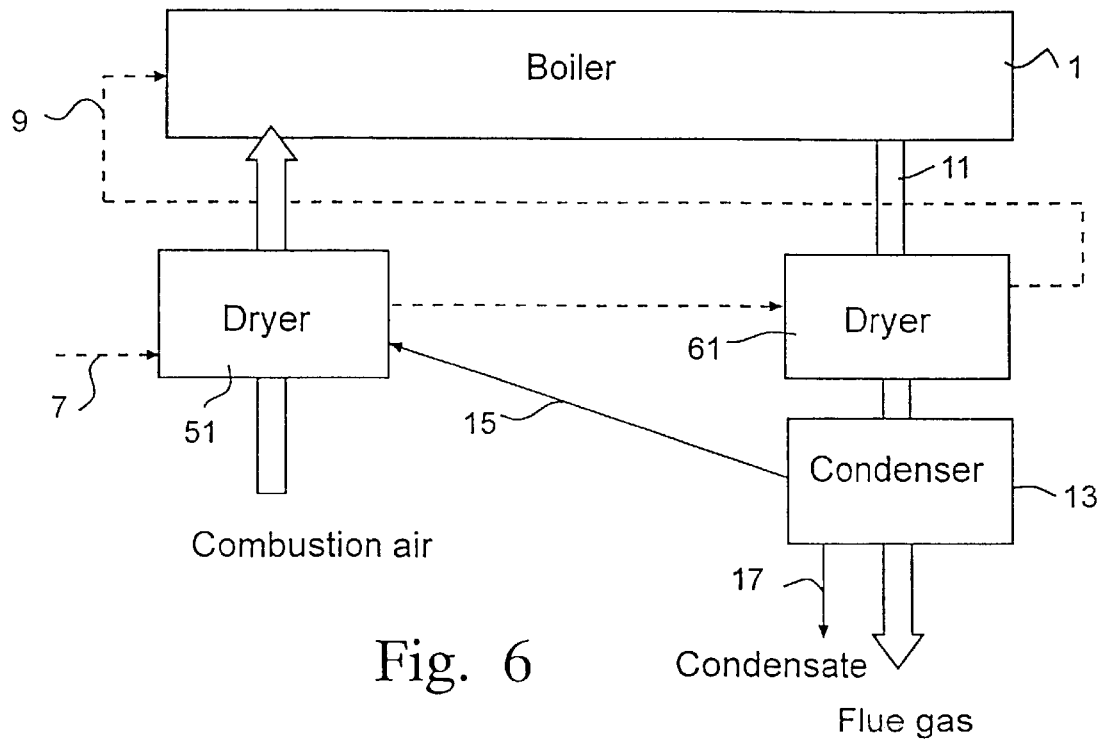
FIG. 6 illustrates schematically a sixth embodiment of the present invention.

In accordance with the embodiment of FIG. 6, the indirect drying by means of flue gas is replaced by direct drying by means of flue gas in a second flue gas drier 61 coupled in series therewith, through which the flue gas flow passes before reaching the condenser 13.

Figure 7:
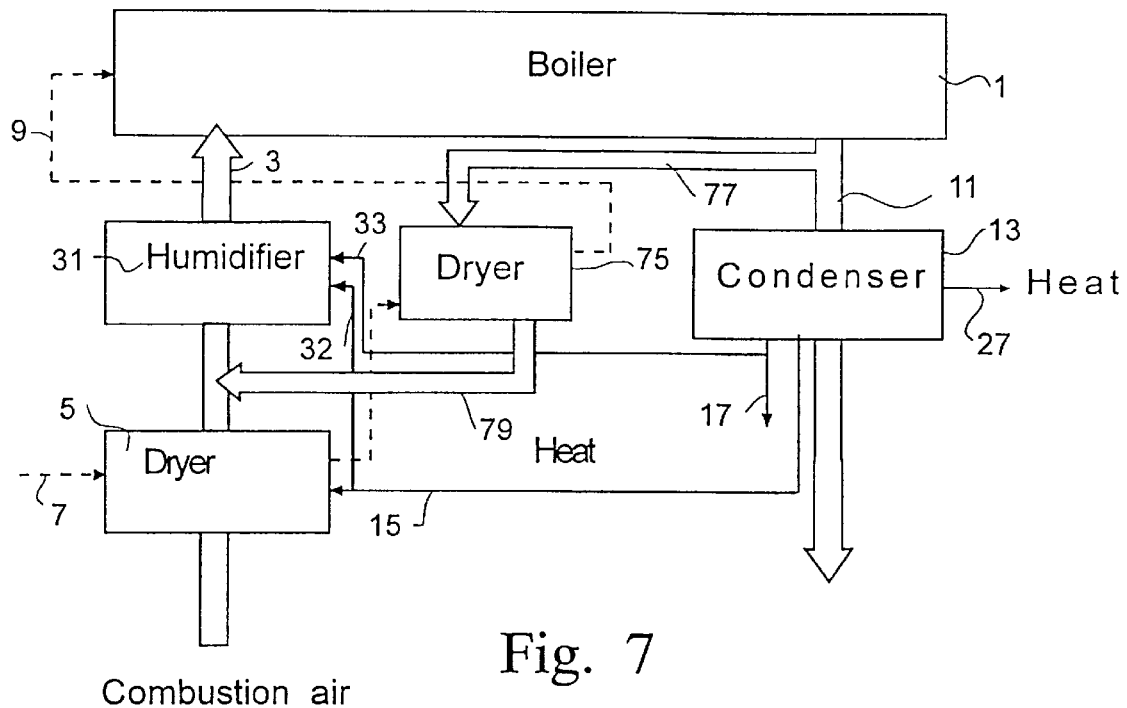
FIG. 7 illustrates schematically a seventh embodiment of the present invention.

The embodiment illustrated in FIG. 7 corresponds to that according to FIG. 3, although provided with a further drier 75 coupled in series for direct drying of the fuel in flue gases. A part flow 77 of the flue gas 11 is carried to the drier 75 for direct contact with the fuel therein, whereupon the gas flow 79 leaving the drier 75 is returned to the combustion air upstream of the humidifier 31. The person skilled in the art realises without further that the drier 5 and the drier 75 could be combined into one and the same apparatus.

Figure 8:
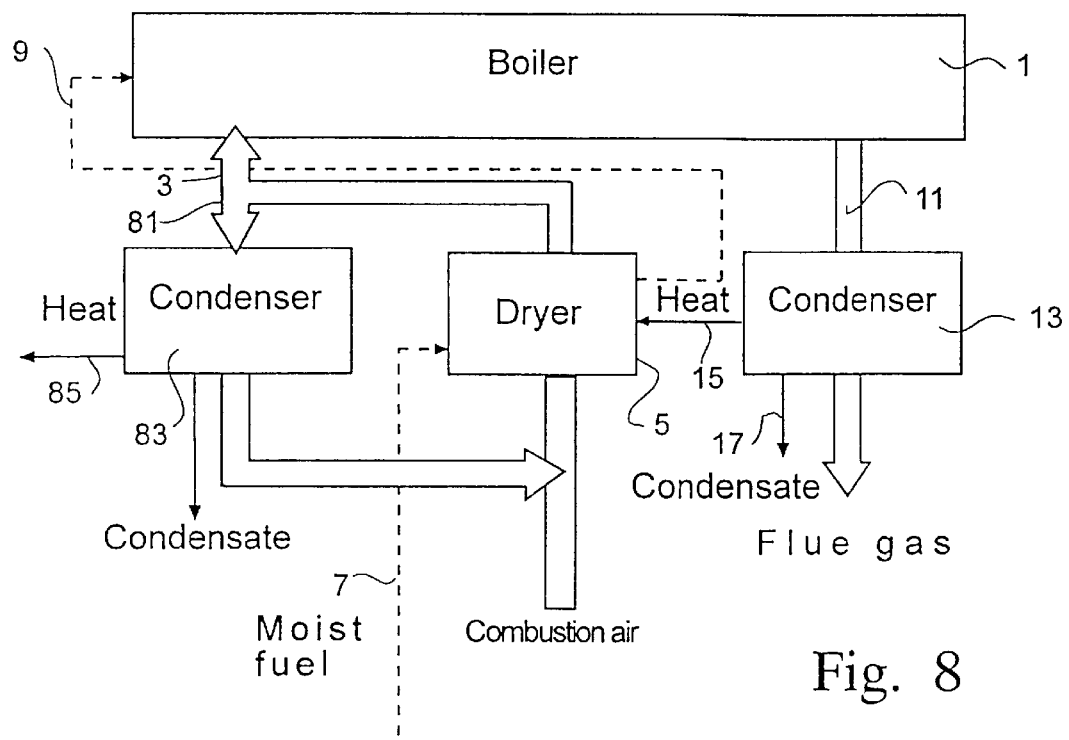
FIG. 8 illustrates schematically an eighth embodiment of the present invention.

The embodiment illustrated in FIG. 8 is based on that according to FIG. 1 but has been provided with a condensation loop for combustion air. A part flow 81 of air is thus diverted from the combustion air after the drier 5 and is carried to a condenser 83, wherein heat 85 may also optionally be recovered, which heat may for instance be supplied to preheat the boilers feed water. The flow of air leaving the condenser 83 may be returned to the combustion air upstream of the drier 5.

Figure 9:
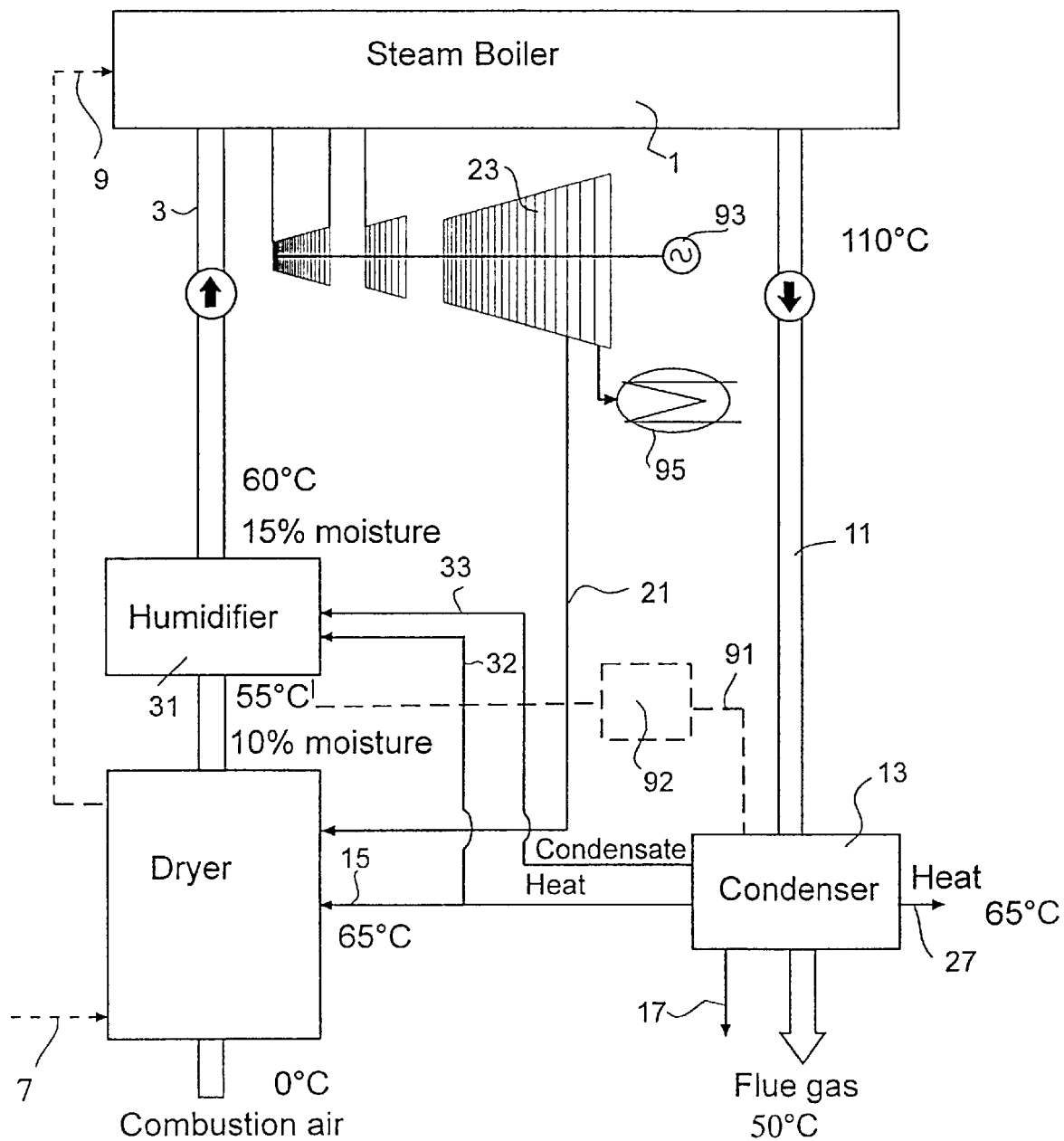
FIG. 9 illustrates schematically a presently preferred embodiment of the present invention.

In FIG. 9, finally, is illustrated an embodiment of the invention that is the preferred one at present and that in principle is a combination of the embodiments of FIGS. 2 and 3. Typical temperature and moisture levels have been indicated in various places in this drawing figure. In FIG. 9, a dashed line 91 and an associated regulating circuit 92 positioned between the condenser 13 and the humidifier 31 illustrate how the humidification of the combustion air may be regulated in response to a parameter detected in the condenser, such as the condensation temperature. This drawing figure also schematically illustrates an electric generator 93 driven by the steam turbine 23 and a heat exchanger 95 to handle the heat of the steam leaving the steam turbine.

Obviously, the invention is not limited to the various combinations of particularities illustrated by the various embodiments but other combinations and modifications are possible within the scope of the appended claims.

What is claimed is:

1. A process of treating moist fuel in connection with a power production process, comprising drying moist fuel in a first drier by means of combustion air supplied directly from the environment, which is thereafter supplied to the power production process, condensing flue gas from the power production process that has become moisture-laden in said drying process to form flue gas condensation, while recovering heat therefrom, and utilizing as drying heat for said first drier secondary heat from the power production process, in the form of flue gas condensation heat or steam condensation heat or combination thereof.

2. A process as claimed in claim 1, wherein heat recovered from the condensation of flue gas is used to dry fuel by heating the fuel-drying combustion air.

3. A process as claimed in claim 1, wherein the flue gas condensation is used to humidify the combustion air.

4. A process as claimed in claim 3, wherein the humidification of the combustion air is controlled in response to the flue gas condensation temperature.

5. A process as claimed in claim 1, wherein the production process includes a steam cycle and the condensation heat from the steam cycle is used for fuel drying by heating the fuel-drying combustion air.

6. A process as claimed in claim 1, wherein the fuel is dried also by utilizing flue gases from the combustion section prior to the flue gas condensation.

7. A process as claimed in claim 6, wherein flue gases from a combustion section are used to heat combustion air, said air then being used to dry the fuel.

8. A process as claimed in claim 6, wherein flue gases from a combustion section is used for direct heating of the fuel.

9. A process as claimed in claim 6, wherein the drying of the fuel by utilizing flue gases is effected as a last step prior to feeding the fuel to the combustion section.

10. A process as claimed in claim 1, wherein a part flow of the combustion air that has become humidified in the fuel-drying operation is condensed and thereafter returned to the incoming combustion air, before the place of drying.

11. A plant for treating moist fuel, comprising power production means for carrying out a power production process including a combustion section supplied with combustion air and a power generating section for generating power; drying means arranged to be supplied with drying air directly from the environment as well as with moist fuel to be dried by said drying air; means for feeding drying air that has become moisture-laden in the fuel-drying process, from said drying means to said power production means as combustion air; flue gas condensing means arranged to be supplied with moisture-laden flue gases from said power production means for condensation thereof for heat-recovery purposes; and means for supplying said drying means with drying heat in the form of secondary heat from the power production process, wherein said flue gas condensing means are arranged and provided for at least one of feeding recovered heat to said drying means to be used as drying heat and feeding steam condensation heat from a steam cycle of the power production process to said drying means to be used as drying heat.

12. A plant as claimed in claim 11, wherein said drying means include means for heating the combustion air by means of said secondary heat before said air passes the fuel for drying thereof.

13. A plant as claimed in claim 11, wherein humidifying means are arranged between said drying means and said power production means, said humidifying means arranged to be supplied from said flue gas condensation means and humidifying the drying air supplied to said power production means as combustion air.

14. A plant as claimed in claim 11, comprising means for withdrawal of drying heat from flue gases from said power production means, said means for withdrawal of drying heat being arranged between said flue gas condensating means and said power production means.

15. A plant as claimed in claim 14, wherein said means for withdrawal of drying heat from flue gases comprises a second drying means for drying of fuel that previously has been dried in said first-mentioned drying means.

16. A plant as claimed in claim 14, wherein said means for withdrawal of drying heat from flue gases comprises heat-exchanging means for withdrawal of drying heat.

17. A process as claimed in claim 2, wherein the flue gas condensation is used to humidify the combustion air.

18. A process as claimed in claim 2, wherein the production process includes a steam cycle, and the steam condensation heat and flue gas condensation heat are used jointly for fuel drying and the condensation heat from the steam cycle is used for fuel drying by heating the fuel-drying combustion air.

19. A process as claimed in claim 7, wherein the drying of the fuel by utilizing flue gases is effected as a last step prior to feeding the fuel to the combustion section.

20. A process as claimed in claim 8, wherein the drying of the fuel by utilizing flue gases is effected as a last step prior to feeding the fuel to the combustion section.

21. A plant as claimed in claim 12, wherein humidifying means are arranged between said drying means and said power production means, said humidifying means arranged to be supplied from said flue gas condensating means and humidifying the drying air supplied to said power production means as combustion air.

22. A plant as claimed in claim 12, comprising means for withdrawal of drying heat from flue gases from said power production means, said means for withdrawal of drying heat being arranged between said flue gas condensating means and said power production means.

23. A plant as claimed in claim 13, comprising means for withdrawal of drying heat from flue gases from said power production means, said means for withdrawal of drying heat being arranged between said flue gas condensating means and said power production means.

24. A process as claimed in claim 1, wherein the moist fuel comprises biomass fuel.

25. A process as claimed in claim 1, wherein the dried fuel is combusted in the power production process directly after drying or after intermediate storage of the dried fuel.

26. A process as claimed in claim 3, wherein the flue gas condensation is used to humidify the combustion air after the combustion air has been used for fuel drying.

27. A process as claimed in claim 4, wherein humidification of the combustion air is in a manner ensuring that the required flue gas condensation temperature is attained.

28. A process as claimed in claim 8, wherein used flue gases are returned to the combustion section.

29. A process as claimed in claim 17, wherein the flue gas condensation is used to humidify the combustion air after the combustion air has been used for fuel drying.

30. A process as claimed in claim 1, wherein the temperature of the combustion air supplied to said first drier ranges from about 0° C. to about 30° C.

31. A process as claimed in claim 1, wherein the temperature of the combustion air supplied to said first drier ranges from about 15° C. to about 20° C.

* * * * *